US010253684B2

(12) United States Patent
Kondo et al.

(10) Patent No.: US 10,253,684 B2
(45) Date of Patent: Apr. 9, 2019

(54) INTERNAL COMBUSTION ENGINE CONTROL APPARATUS AND INTERNAL COMBUSTION ENGINE CONTROL METHOD

(75) Inventors: Shinya Kondo, Gotemba (JP); Ryosuke Tsukamoto, Susono (JP); Hironori Kitadani, Nagakute (JP); Jun Aoki, Toyota (JP); Shinsuke Kiyomiya, Seto (JP); Kazuyoshi Tashiro, Nagoya (JP); Satoshi Kawai, Chiryu (JP); Tatsuro Nakata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 179 days.

(21) Appl. No.: 14/237,836

(22) PCT Filed: Aug. 6, 2012

(86) PCT No.: PCT/IB2012/001618
§ 371 (c)(1),
(2), (4) Date: Mar. 31, 2014

(87) PCT Pub. No.: WO2013/021278
PCT Pub. Date: Feb. 14, 2013

(65) Prior Publication Data
US 2014/0230757 A1 Aug. 21, 2014

(30) Foreign Application Priority Data
Aug. 9, 2011 (JP) .................................. 2011-174370

(51) Int. Cl.
*F02B 41/00* (2006.01)
*F02B 43/10* (2006.01)
(Continued)

(52) U.S. Cl.
CPC ............... *F02B 43/10* (2013.01); *F01N 3/22* (2013.01); *F01N 3/32* (2013.01); *F01N 11/00* (2013.01);
(Continued)

(58) Field of Classification Search
USPC .......................................................... 123/26
See application file for complete search history.

(56) References Cited

U.S. PATENT DOCUMENTS 5,852,929 A * 12/1998 Kato ....................... F01N 11/00
60/274
5,921,077 A * 7/1999 Bayerle .................... F01N 3/22
60/274
(Continued)

FOREIGN PATENT DOCUMENTS

| EP | 1 293 648 A2 | 3/2003 |
|---|---|---|
| JP | 2000-045839 A | 2/2000 |

(Continued)

OTHER PUBLICATIONS

International Search Report in International Application No. PCT/IB2012/001618, dated Dec. 4, 2012.

*Primary Examiner* — Lindsay Low
*Assistant Examiner* — Ruben Picon-Feliciano
(74) *Attorney, Agent, or Firm* — Hunton Andrews Kurth LLP

(57) ABSTRACT

An internal combustion engine control apparatus includes a secondary air supply device having a secondary air supply passage that supplies secondary air pumped by an air pump into an exhaust system of an internal combustion engine and an opening/closing unit that opens and closes the secondary air supply passage. A controller provided in the internal combustion engine control apparatus sets the opening/closing unit in an open condition such that the secondary air is supplied to the secondary air supply passage, and then
(Continued)

executes foreign matter removal control in which the opening/closing unit is opened and closed. As a result, foreign matter caught in an ASV during AI control is removed immediately. By implementing OBD after removing the foreign matter, detection of an open sticking abnormality caused by foreign matter caught in the ASV is suppressed.

11 Claims, 12 Drawing Sheets

(51) Int. Cl.
    *F01N 3/22*     (2006.01)
    *F01N 3/32*     (2006.01)
    *F01N 11/00*     (2006.01)

(52) U.S. Cl.
    CPC ...... *F01N 2260/26* (2013.01); *F01N 2550/14* (2013.01); *F01N 2610/085* (2013.01); *F01N 2610/1486* (2013.01); *F01N 2610/1493* (2013.01); *Y02T 10/20* (2013.01); *Y02T 10/47* (2013.01)

(56) References Cited

U.S. PATENT DOCUMENTS

| | | |
|---|---|---|
| 2001/0013222 A1 | 8/2001 | Mizoguchi |
| 2003/0061805 A1 | 4/2003 | Hirooka et al. |
| 2004/0194446 A1 | 10/2004 | Hirooka |
| 2006/0048504 A1 | 3/2006 | Oi et al. |
| 2006/0213483 A1 | 9/2006 | Miyachi |

FOREIGN PATENT DOCUMENTS

| | | | |
|---|---|---|---|
| JP | 2000-220535 A | 8/2000 |
| JP | 2001-227328 A | 8/2001 |
| JP | 2001-234768 A | 8/2001 |
| JP | 2003-083048 A | 3/2003 |
| JP | 2005-264879 A | 9/2005 |
| JP | 2005-351198 A | 12/2005 |
| JP | 2006-249952 A | 9/2006 |
| JP | 2008-101632 A | 5/2008 |

\* cited by examiner

INTERNAL COMBUSTION ENGINE CONTROL APPARATUS AND INTERNAL COMBUSTION ENGINE CONTROL METHOD

CROSS-REFERENCE TO RELATED APPLICATIONS

This is a national phase application based on the PCT International Patent Application No. PCT/IB2012/001618 filed on Aug. 6, 2012, which claims priority to Japanese Patent Application No. 2011-174370, filed Aug. 9, 2011, the entire contents of each of which are incorporated herein by reference.

BACKGROUND OF THE INVENTION

1. Field of the Invention

The invention disclosed in this specification relates to a control apparatus and a control method for an internal combustion engine.

2. Description of Related Art

In a secondary air supply device available in the related art, air is delivered to an exhaust port of an internal combustion engine from the outside, exhaust gas in and beyond the exhaust port is oxidized by causing oxygen (O2) in the air to react with the exhaust gas, and as a result, an amount of discharged unburned gas such as hydrocarbon (HC) and carbon monoxide (CO) is reduced. When, in this type of secondary air supply device, a malfunction occurs in an air pump (A/P) or an air switching valve (ASV), a blockage occurs in a flow passage for supplying secondary air, and so on, the air is not delivered normally to the exhaust port, and as a result, exhaust gas emissions from the internal combustion engine increase. Hence, an abnormality diagnosis (On-Board Diagnostics (OBD)) is performed on the secondary air supply device. Japanese Patent Application Publication No. 2003-83048 (JP-2003-83048 A) discloses an abnormality diagnosis for a secondary air supply device, in which, for example, pressure behavior patterns determined from a pressure value and a pressure variation value detected by a pressure sensor disposed between the A/P and the ASV are determined respectively when secondary air supply is underway and when secondary air supply is stopped. A condition of the secondary air supply device is then determined on the basis of variation in the pressure behavior patterns in the respective cases. Here, when foreign matter becomes caught in the ASV, it may be determined that that the ASV is stuck in an open condition, and as a result, an abnormality may be diagnosed.

Incidentally, secondary air supply (Air Injection (AI)) to be referred to as AI hereafter) control is typically performed during a cold start of the internal combustion engine. When the internal combustion engine performs a cold start, ice formed in a pipe for supplying the secondary air may move toward the ASV, and as a result, the ice as foreign matter may become caught between a housing and a valve body of the ASV. When an abnormality diagnosis is performed in a condition where ice is caught in the ASV, it is determined that an open sticking abnormality has occurred in the ASV. When the foreign matter is ice, however, the ice melts as a peripheral temperature increases, making it difficult to find out the cause of the abnormality during an inspection of the ASV. In a case where an abnormality is detected but the cause thereof cannot be specified, component replacement is required.

A similar problem may occur with foreign matter other than ice. More specifically, it may be determined that an open sticking abnormality has occurred even though the caught foreign matter has been removed, thereby eliminating the abnormality such that in actuality, an abnormality has not occurred in the ASV. Likewise in this case, it is difficult to find out the cause of the abnormality during an inspection of the ASV, and since the cause remains unidentified, component replacement is required.

SUMMARY OF THE INVENTION

Hence, the invention provides a control apparatus and a control method for an internal combustion engine with which a condition in which foreign matter is caught can be eliminated, thereby avoiding an erroneous diagnosis of an open sticking abnormality during an abnormality diagnosis performed on a secondary air supply device.

An internal combustion engine control apparatus according to a first aspect of the invention includes a secondary air supply device having a secondary air supply passage that supplies secondary air pumped by an A/P into an exhaust system of an internal combustion engine and an opening/closing unit that opens and closes the secondary air supply passage, wherein the opening/closing unit is set in an open condition such that the secondary air is supplied to the secondary air supply passage, after which foreign matter removal control in which the opening/closing unit is opened and closed is executed.

By performing the foreign matter removal control after secondary air supply control, foreign matter caught in the opening/closing unit due to the secondary air supply control can be removed. By removing the foreign matter, an erroneous diagnosis of an open sticking abnormality during a subsequent abnormality diagnosis can be avoided.

In the internal combustion engine control apparatus according to the first aspect of the invention, the foreign matter removal control may be executed before performing an abnormality diagnosis on the secondary air supply device.

In the internal combustion engine control apparatus according to the first aspect of the invention, an opening/closing operation performed in the opening/closing unit during the foreign matter removal control may have a shorter opening/closing interval than an opening/closing operation performed in the opening/closing unit during secondary air supply for supplying the secondary air to the secondary air supply passage.

In the internal combustion engine control apparatus according to the first aspect of the invention, a determination as to whether or not a condition for terminating the foreign matter removal control is satisfied may be made in accordance with the number of opening/closing operations performed in the opening/closing unit during the foreign matter removal control. Further, the determination as to whether or not the condition for terminating the foreign matter removal control is satisfied may be made in accordance with an elapsed time following a start point of the foreign matter removal control. By terminating the foreign matter removal control as early as possible, a length and a frequency of operations of the A/P while the ASV is in a closed condition can be reduced, and as a result, a load exerted on the A/P during the foreign matter removal control can be lightened.

In the internal combustion engine control apparatus according to the first aspect of the invention, the determination as to whether or not the condition for terminating the foreign matter removal control is satisfied may be made in accordance with a pressure condition in the secondary air supply passage accompanying the opening/closing operation of the opening/closing unit. By referring to the pressure condition, the presence or absence of foreign matter caught in the ASV can be determined, and therefore, when it is determined that the caught foreign matter has been removed, the foreign matter removal control can be terminated.

In the internal combustion engine control apparatus according to the first aspect of the invention, the pressure condition in the secondary air supply passage may be determined from a pressure value on an upstream side of the opening/closing unit when the opening/closing unit is in a closed condition. Further, the pressure condition in the secondary air supply passage may be determined by referring to a pressure variation value on an upstream side of the opening/closing unit when the opening/closing unit is in the closed condition. Furthermore, the pressure condition in the secondary air supply passage may be determined by referring to a difference value between a pressure value on an upstream side of the opening/closing unit when the opening/closing unit is in the closed condition and the pressure value on the upstream side of the opening/closing unit when the opening/closing unit is in the open condition.

Moreover, in the internal combustion engine control apparatus according to the first aspect of the invention, the pressure condition in the secondary air supply passage may be determined by referring to a difference value between a pressure value on an upstream side of the opening/closing unit and a pressure value on a downstream side of the opening/closing unit when the opening/closing unit is in the closed condition.

Further, in the internal combustion engine control apparatus according to the first aspect of the invention, the pressure condition in the secondary air supply passage may be determined by referring to a difference value between a pressure variation value on an upstream side of the opening/closing unit and a pressure variation value on a downstream side of the opening/closing unit when the opening/closing unit is in the closed condition.

Furthermore, in the internal combustion engine control apparatus according to the first aspect of the invention, the pressure condition in the secondary air supply passage may be determined by referring to a difference value between a differential pressure value between a pressure value on an upstream side of the opening/closing unit and a pressure value on a downstream side of the opening/closing unit when the opening/closing unit is in the closed condition and the differential pressure value between the pressure value on the upstream side of the opening/closing unit and the pressure value on the downstream side of the opening/closing unit when the opening/closing unit is in the open condition.

In the internal combustion engine control apparatus according to the first aspect of the invention, an amount of air pumped by the A/P may be made variable, and the controller may increase the amount of air pumped by the A/P during the foreign matter removal control beyond the amount of air, pumped by the A/P during the secondary air supply control. By increasing the amount of pumped air, the foreign matter can be removed efficiently.

In the internal combustion engine control apparatus according to the first aspect of the invention, the controller may perform the abnormality diagnosis on the secondary air supply device after the foreign matter removal control is terminated. By performing the abnormality diagnosis after removing the foreign matter caught when the ASV is opened during the secondary air supply control (AI control), detection of an open sticking abnormality, cause of which cannot be identified, is avoided.

The internal combustion engine control method according to the second aspect of the invention may include a secondary air supply device having a secondary air supply passage that supplies secondary air pumped by an A/P into an exhaust system of an internal combustion engine and an opening/closing unit that opens and closes the secondary air supply passage, wherein the opening/closing unit may be set in an open condition such that the secondary air is supplied to the secondary air supply passage, after which foreign matter removal control in which the opening/closing unit is opened and closed may be executed.

With the internal combustion engine control apparatus and a control method according to the invention, a condition in which foreign matter is caught can be eliminated, thereby avoiding an erroneous diagnosis of an open sticking abnormality during an abnormality diagnosis performed on a secondary air supply device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
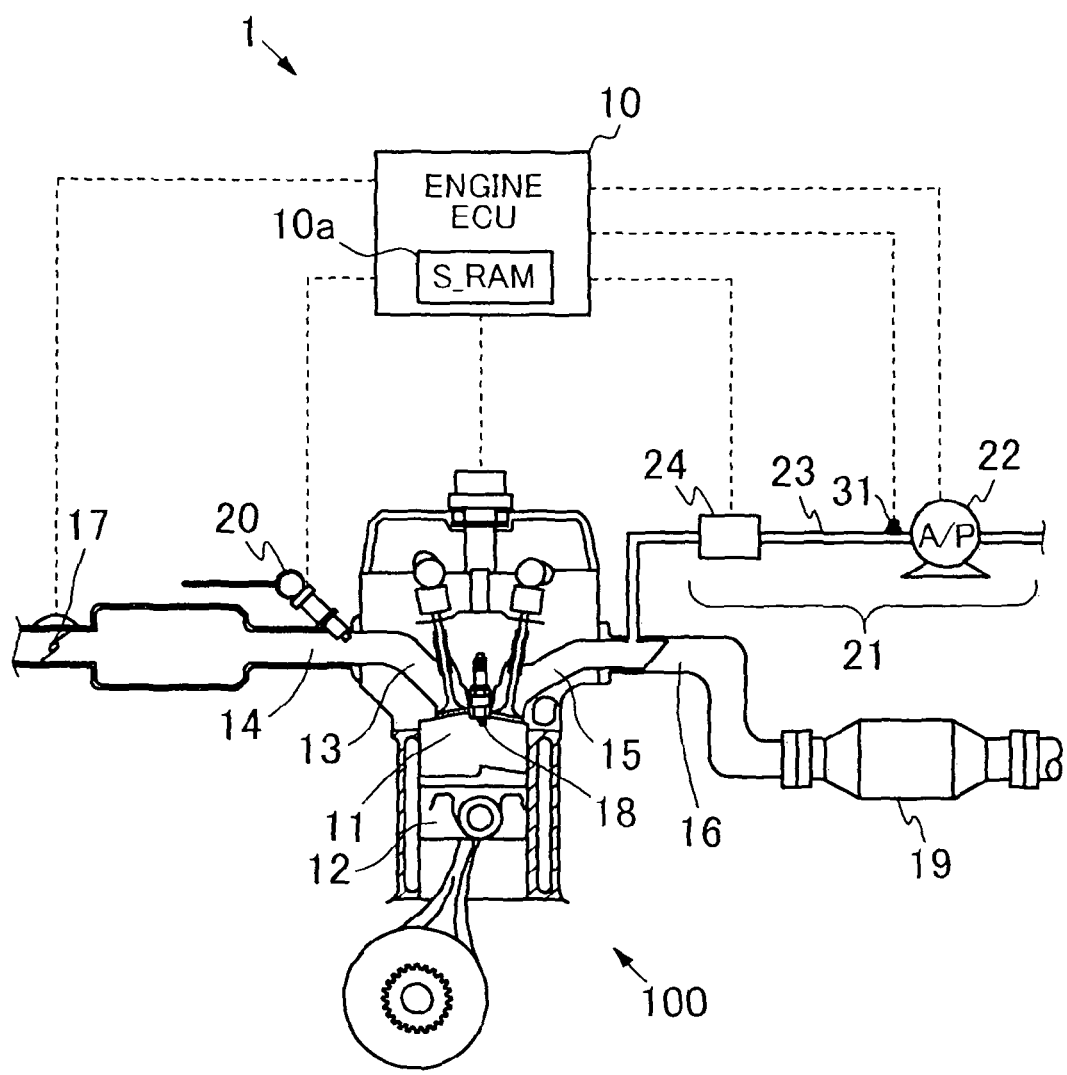
FIG. 1 is an illustrative view showing a schematic configuration of an engine system installed with an internal combustion engine control apparatus according to an embodiment.

Embodiments of the invention will be described in detail below together with the drawings. Note, however, that dimensions, ratios, and so on of respective parts in the drawings may not be illustrated so as to match their actual counterparts exactly.

Figure 2:
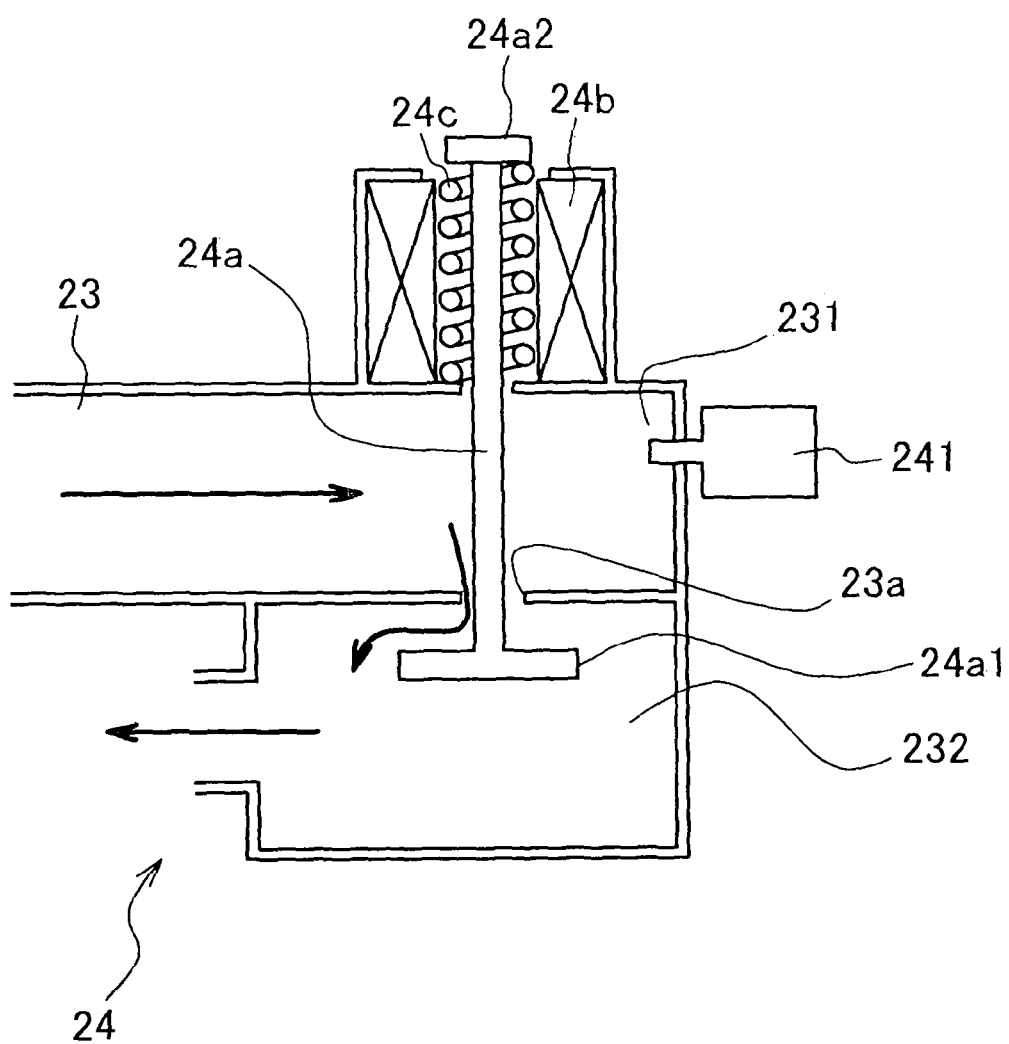
FIG. 2 is an illustrative view showing an ASV and a front side pressure sensor.

FIG. 1 is a view showing a configuration of an engine system 1 installed with an internal combustion engine control apparatus according to an embodiment the invention. Only a part of the configuration of the engine is shown in FIG. 1. FIG. 2 is an illustrative view showing an ASV 24 and a front side pressure sensor 241.

The engine system 1 shown in FIG. 1 includes an engine 100 serving as a power source, and an engine electronic control unit (ECU) 10 that performs overall control of an operation of the engine 100. The engine system 1 also includes a secondary air supply device 21 having an A/P 22, a secondary air supply passage 23, and the ASV 24. The secondary air supply passage 23 is sectioned with a connecting hole 23a interposed between an upstream side passage 231 and a downstream side passage 232.

The engine 100 is a spark ignition type multi-cylinder engine installed in a vehicle, and each cylinder includes a piston 12 forming a combustion chamber 11. The pistons 12 of the respective combustion chambers 11 are fitted to the cylinders of the engine 100 to be free to slide and connected to a crankshaft serving as an output shaft member via connecting rods (not shown). Intake air flowing into an intake port 13 intermixes with fuel injected by an injector 20, and a resulting air-fuel mixture is compressed within the combustion chamber 11 by an ascending motion of the piston 12. The engine ECU 10 ignites the compressed mixed gas by igniting a spark plug 18 in the combustion chamber on the basis of information indicating a position of the piston 12, obtained from a crank angle sensor, and a cam shaft rotary phase, obtained from an intake cam angle sensor. Accordingly, the interior of the combustion chamber 11 expands, causing the piston 12 to descend. This descending motion is converted into axial rotation of the crankshaft via the connecting rod, and as a result, the engine 100 obtains power. In this case, the engine 100 is not limited to a gasoline engine that uses gasoline as fuel, and may also be a flexible fuel engine that uses fuel obtained by mixing together gasoline and alcohol in desired proportions. The engine 100 is also not limited to a spark ignition type engine and may be a compressed self-ignition type engine. Further, the engine system 1 may be a hybrid system combining the engine 100 and a plurality of electric motors. Note that the engine 100 serves as a configuration of the internal combustion engine according to an embodiment the invention.

The intake port 13 communicating with the combustion chamber 11 of each cylinder and an intake passage 14 that is connected to the intake port 13 in order to lead intake air from the intake port 13 into the combustion chamber 11 are connected to each combustion chamber 11. Further, an exhaust port 15 that communicates with the combustion chamber 11 of each cylinder and an exhaust passage 16 that leads exhaust gas generated in the combustion chamber to the exterior of the engine 100 are connected to each combustion chamber 11.

An air flow meter, a throttle valve 17, and a throttle position sensor are disposed in the intake passage 14. The air flow meter and the throttle position sensor detect an intake air amount passing through the intake passage 14 and an opening of the throttle valve 17, respectively, and transmit corresponding detection results to the engine ECU 10. The engine ECU 10 acknowledges the intake air amount introduced into the intake port 13 and the combustion chamber 11 on the basis of the transmitted detection results, and adjusts the intake air amount by adjusting the opening of the throttle valve 17. A throttle-by-wire type valve using a step motor is preferably applied as the throttle valve 17, but a mechanical throttle mechanism that operates in conjunction with an accelerator pedal (not shown) via a wire or the like instead of a step motor to modify the opening of the throttle valve 17, for example, may also be applied.

A purification catalyst 19 is provided at an end of the exhaust passage 16. When an exhaust valve is open, post-combustion exhaust gas is discharged to the exterior of the engine 100 from the exhaust port 15 and the exhaust passage 16 via the purification catalyst 19. The purification catalyst 19 is used to purify the exhaust gas of the engine 100, and a three-way catalyst, a NOx occlusion reduction catalyst, or the like, for example, is applied as the purification catalyst 19.

Further, an exhaust gas temperature sensor, an A/F (air-fuel ratio) sensor, and an O2 sensor (not shown) are provided in the exhaust passage 16 to detect the temperature and air-fuel ratio of the post-combustion exhaust gas, and results obtained thereby are transmitted to the engine ECU 10. The engine ECU 10 obtains combustion information relating to the combustion chamber on the basis of the detection results from the exhaust gas temperature sensor, the A/F sensor, and the O2 sensor, and executes feedback control to adjust a fuel injection amount such that an optimum combustion condition is realized.

The secondary air supply device 21 is connected to the exhaust port 15. The A/P 22 supplies secondary air taken in from the exterior of the engine 100 or through an air cleaner to the exhaust port 15 via the secondary air supply passage 23 in response to a command from the engine ECU 10. As a result, unburned gas such as HC and CO in the exhaust port 15 is burned again by being caused to react with O2 in the supplied secondary air, thereby reducing an amount of unburned gas discharged from the engine 100.

The ASV 24 attached to the secondary air supply passage 23 opens or closes the secondary air supply passage 23 in response to a command from the engine ECU 10. The ASV 24 serves as an example of an opening/closing unit, and a solenoid opening/closing valve is used as the ASV 24. The ASV 24 includes a shaft member 24a having a valve portion 24a1 on a tip end portion, thereof. The ASV 24 also includes a solenoid 24b disposed on a periphery of the shaft member 24a and a spring member 24c. A coil spring is used as the spring member 24c, but another type of spring member may be used instead. The spring member is sandwiched between, a spring bearing collar portion 24a2 provided on the shaft member 24a and a housing portion of the solenoid 24b, and biases the shaft member 24a to a valve closing side. When the solenoid 24b is not energized, the valve portion 24a1 is in a closed condition. When the solenoid 24b is energized, the shaft member 24a is pushed down, thereby opening the connecting hole 23a such that the valve portion 24a1 enters an open condition. When the shaft member 24a is pushed down, the spring member 24c is compressed, leading to strengthening of a biasing force for moving the shaft member 24a in a valve closing direction. The ASV 24 prevents an excessive oxidation reaction from taking place in the purification catalyst 19 by adjusting the amount of secondary air supplied from the A/P 22 to the exhaust port 15 so that the secondary air is supplied to the exhaust port 15 in an amount corresponding to the amount of unburned gas in the exhaust gas.

Note that the ASV 24 is not limited to a solenoid type valve, and another type of opening/closing valve may be used. For example, the ASV 24 may be a butterfly type opening/closing valve or a slide type opening/closing valve.

The internal combustion engine control apparatus includes the front side pressure sensor 241 that detects a pressure in the upstream side passage 231 of the secondary air supply passage 23, on an upstream side of the ASV 24, or in other words a pressure on a front side of the ASV 24.

The engine ECU 10 is a computer including a central processing unit (CPU) that performs calculation processing, a read only memory (ROM) that stores programs and the like, and a random access memory (RAM) that stores data and the like. The engine ECU 10 reads detection results from the crank angle sensor, a water temperature sensor, the air flow meter, the exhaust gas temperature sensor, the A/F sensor, the O2 sensor, and so on provided in respective parts of the engine 100, and performs overall control of an operation of the engine 100, such as an operation of the throttle valve 17, an operation of the spark plug 18, and an operation of the injector 20, on the basis of these detection results.

The engine ECU 10 includes a standby RAM 10a serving as a backup memory that stores and holds data even after an ignition is switched OFF. Learned values and the like that are updated as appropriate are stored in the standby RAM 10a. Note that a nonvolatile memory such as an electrically erasable programmable read-only memory (EEPROM) may be used as the backup memory.

The engine ECU 10 controls an operation of the secondary air supply device 21 on the basis of an operating condition of the engine 100. The engine ECU 10 also functions as a control unit of the internal combustion engine control apparatus according to an embodiment the invention, which performs calculations and issues commands in relation to AI control, foreign matter removal control, and abnormality diagnosis control.

Figure 3:
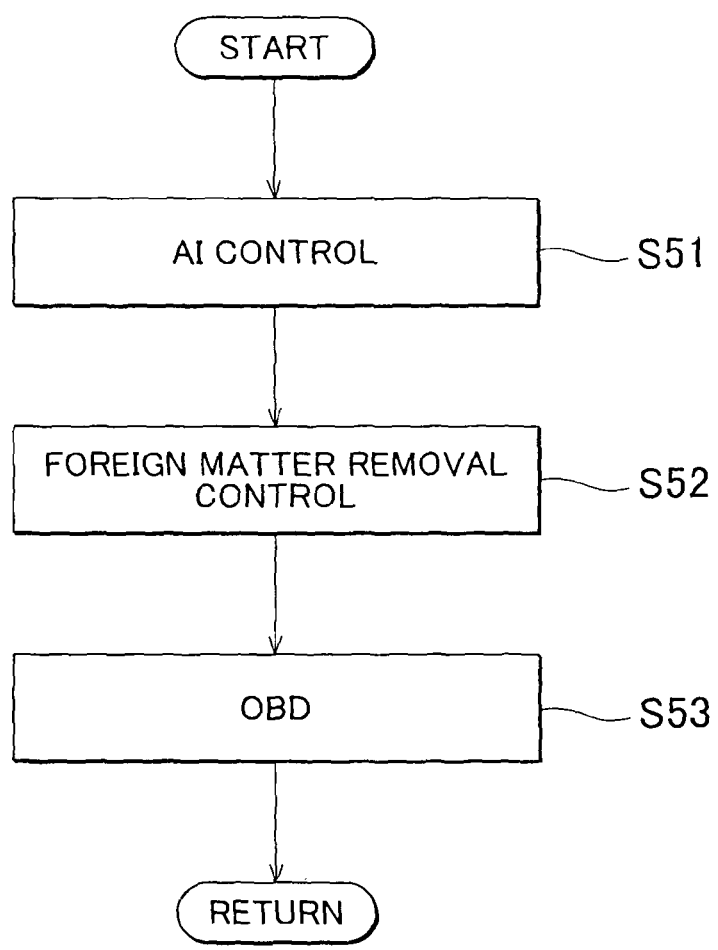
FIG. 3 is a flowchart showing overall control performed by the internal combustion engine control apparatus according to this embodiment.

FIG. 3 is a flowchart showing overall control performed by the internal combustion engine control apparatus, or more specifically the engine ECU 10. First, the engine ECU 10 performs the AI control (Step S51) when the AI control is required, for example during a cold start of the engine 100. In the AI control, the ASV 24 is maintained in the open condition so that secondary air is supplied to the secondary air supply passage 23. The open condition of the ASV 24 is determined in accordance with the condition of the exhaust gas, but normally lasts between 20 and 30 seconds. After being maintained in the open condition for a fixed period, the ASV 24 is returned to the closed condition, but at this time, ice constituting foreign matter may become caught around the connecting hole 23a. Therefore, when the AI control is complete, the foreign matter removal control is performed (Step S52). In the foreign matter removal control, foreign matter is removed by causing the ASV 24 to perform an opening/closing operation. When the foreign matter removal control is complete, OBD is performed (Step S53). By performing OBD following the foreign matter removal control, detection of an open sticking abnormality caused by caught foreign matter can be avoided. As a result, a condition in which an open sticking abnormality is observed but the cause thereof remains unidentified can be avoided.

Next, the AI control and the foreign matter removal control performed by the engine ECU 10 will be described with reference to a time chart shown in FIG. 4 and a flowchart shown in FIG. 5. Determinations relating to conditions for shifting from the AI control to the foreign matter removal control and conditions for terminating the foreign matter removal control will be described in particular detail.

First, in Step S1, a determination is made as to whether or not an AI control history exists. The AI control history is deleted together with an operation to switch the ignition OFF. Therefore, in the processing of the first Step S1 performed immediately after the ignition is switched ON, the AI control history is determined not to exist, whereupon the routine advances to Step S2.

In Step S2, a determination is made as to whether or not an AI operation condition, or in other words a condition for implementing the AI control, is established. The condition for implementing the AI control to perform an AI operation is determined by referring to various parameters such as a cooling water temperature during engine startup, an intake air temperature, an elapsed time following startup of the internal combustion engine, and a battery voltage, for example. When an affirmative determination is made in Step S2, the routine advances to Step S3.

In Step S3, a determination is made as to whether or not an AI stopping condition remains non-established. The AI control is normally performed until catalyst warm-up is complete during a cold start of the engine 100. In this embodiment, the AI stopping condition is determined to be satisfied when an integrated value of the engine intake air amount exceeds a predetermined value. Note that a water temperature increase or another parameter may be employed as the AI stopping condition. In a case where the water temperature increase is employed, it may be determined that the AI stopping condition is satisfied when the water temperature increase exceeds a predetermined value. When an affirmative determination is made in Step S3, the routine advances to Step S4. When a negative determination is made in Step S3, the routine advances to Step S7.

In Step S4, a determination is made as to whether or not an AI interruption condition remains non-established. The AI control is interrupted when the vehicle enters a rapid acceleration condition or the like, for example. In this embodiment, therefore, a determination to interrupt the AI control is made when an intake air amount during warm-up exceeds a predetermined value. When an affirmative determination is made in Step S4, the routine advances to Step S5. When a negative determination is made in Step S4, the routine advances to Step S7.

In Step S5, the AI control is actually started. More specifically, the A/P 22 is started and the ASV 24 is set in the open condition. Further, as shown in FIG. 4, an AI control flag is set to ON.

Figure 4:
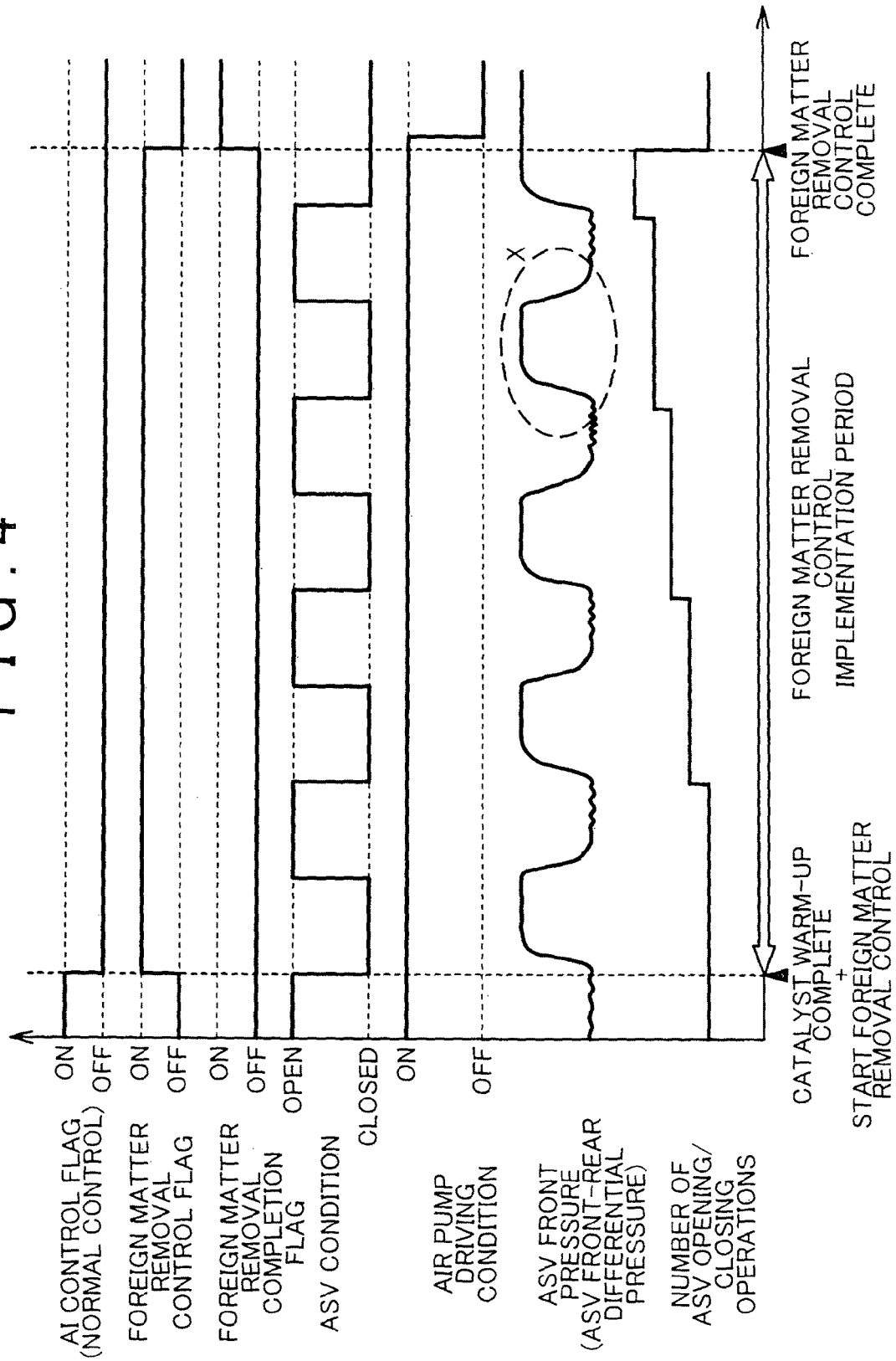
FIG. 4 is an example of a time chart during an operation of the internal combustion engine control apparatus according to this embodiment.
Figure 5:
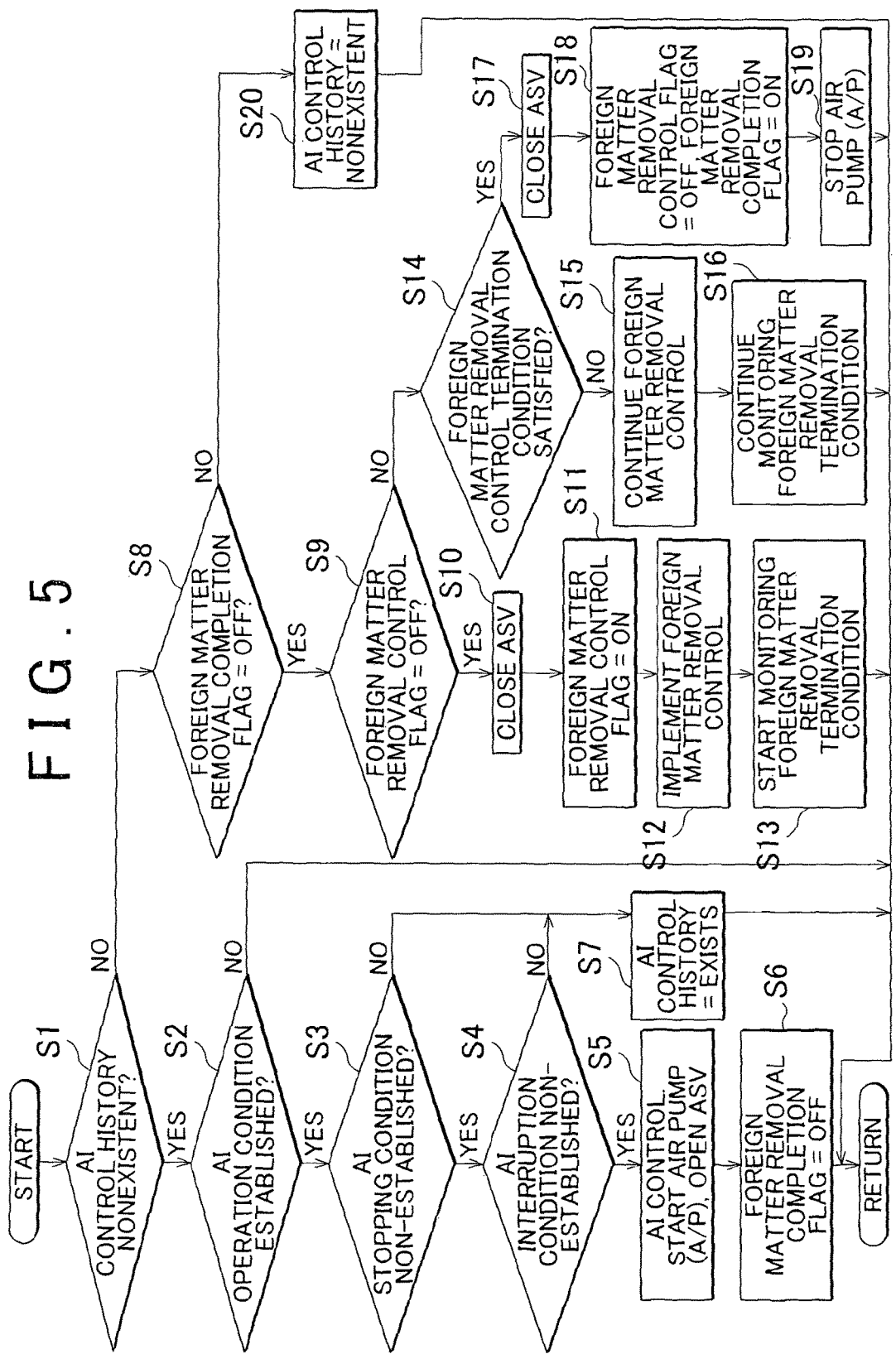
FIG. 5 is a flowchart showing foreign matter removal control performed by the internal combustion engine control apparatus according to this embodiment.

In Step S6, a foreign matter removal completion flag is set to OFF, as shown in FIG. 4. When the ASV 24 enters the open condition in accordance with the AI control, ice (foreign matter) may become caught therein. Hence, when the ASV 24 has passed through the open condition accompanying the AI control, the foreign matter removal completion flag is set to OFF temporarily to ensure that the foreign matter removal control is performed. Following Step S6, the processing is returned.

Figure 6:
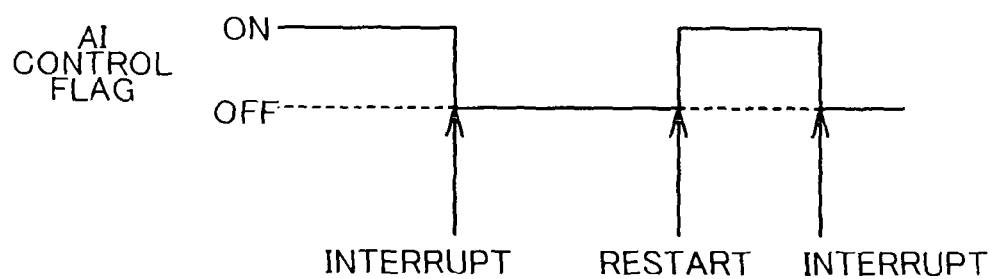
FIG. 6 is an illustrative view showing a condition of an AI control flag.

When the determination of Step S1 is performed again after the ignition has been switched ON and the processing of Step S1 to Step S6 has been performed, the AI control history is determined not to exist again in Step S1. When a negative determination is made in Step S3 or Step S4 after determining again in Step S1 that the AI control history does not exist, the routine advances to Step S7. In Step S7, the AI control history is recorded as existing. In other words, when the AI control is stopped or interrupted, the AI control history is determined to exist. Here, referring to FIG. 6, the AI control flag in a case where the AI control is interrupted will be described. The AI control flag is set to ON when the ASV 24 is set in the open condition accompanying the AI control, and set to OFF when the interruption condition is established such that the ASV 24 is set in the closed condition. Hence, even when the AI control is interrupted, the AI control history is determined to exist as long as the AI control flag was ON previous thereto. In other words, the AI control history is determined to exist when the ASV 24 is set in the open condition during the AI control such that foreign matter may be caught therein.

Following Step S7, the processing is returned again. When the routine returns to Step S1 again via S7, the AI control history is determined to exist in Step S1. When the AI control history is determined to exist in Step S1, the routine advances to Step S8.

In Step S8, a determination is made as to whether or not the foreign matter removal completion flag is OFF. In a case where the foreign matter removal control has not been performed following Step S6, an affirmative determination is made in Step S8, whereupon the routine advances to Step S9.

In Step S9, a determination is made as to whether or not a foreign matter removal control flag is OFF. As shown in FIG. 4, the foreign matter removal control flag is set to OFF when the AI control is performed. When the processing of Step S9 is performed for the first time following the start of the control series from Step S1, the determination is affirmative. When an affirmative determination is made in Step S9, the routine advances to Step S10.

In Step S10, the ASV 24 is set in the closed condition temporarily. The timing thereof matches the timing at which catalyst warm-up is determined to be complete as a result of the AI control. When the AI control is complete, the foreign matter removal control is performed. Setting the ASV 24 in the closed condition is a measure taken in preparation for the foreign matter removal control to be performed subsequently from Step S11 onward. When the ASV 24 is set in the closed condition, the A/P 22 continues to be driven, and therefore the pressure on the upstream side of the ASV 24 begins to rise.

In Step S11 performed after Step S10, the foreign matter removal control flag is set to ON to indicate that the foreign matter removal control is underway. The foreign matter removal control is then started in Step S12. Note that the processing of Step S11 may be performed simultaneously with the processing of Step S10 or the processing of Step S12.

Figure 7:
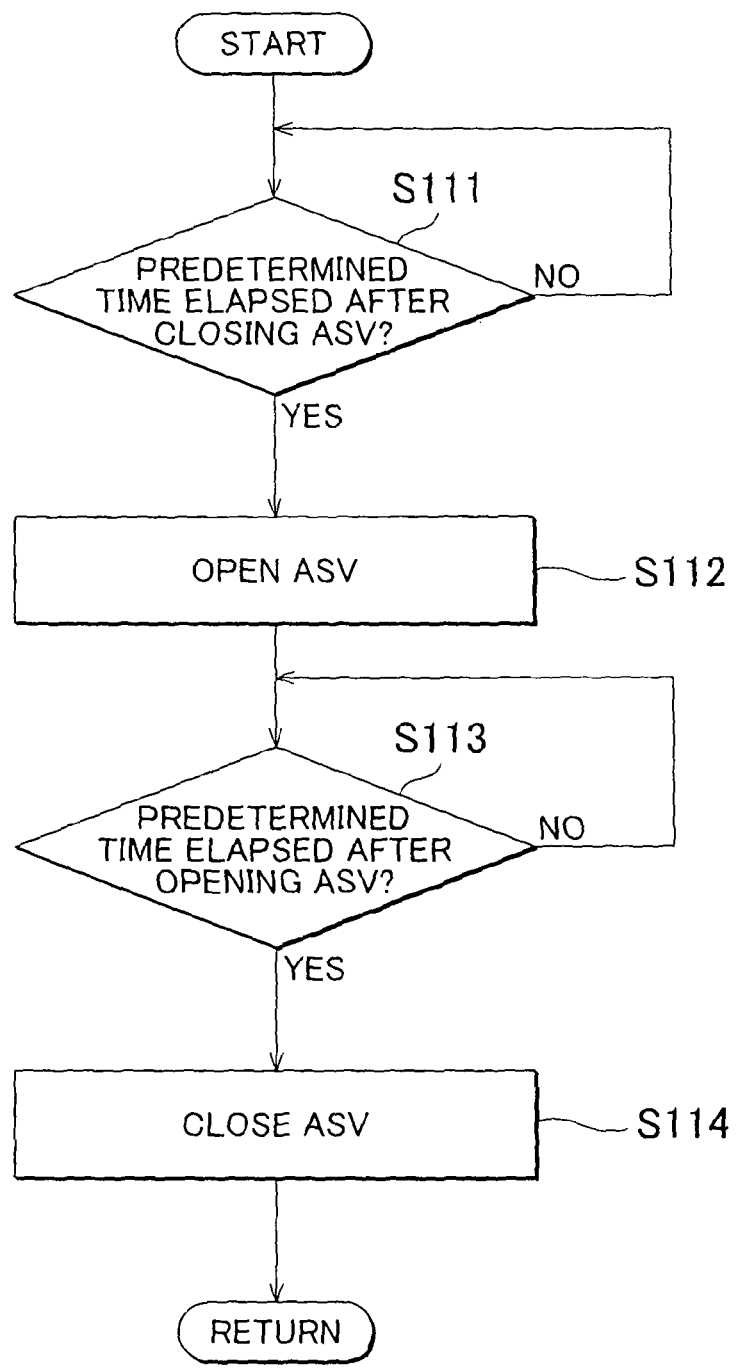
FIG. 7 is a flowchart showing ASV opening/closing control during the foreign matter removal control performed by the internal combustion engine control apparatus according to this embodiment.

FIG. 7 is a flowchart showing opening/closing control of the ASV during the foreign matter removal control performed by the internal combustion engine control apparatus according to this embodiment. First, in Step S111, a determination is made as to whether or not a predetermined time has elapsed after setting the ASV 24 in the closed condition in Step S10. Here, the predetermined time following closing of the ASV may be determined as desired. For example, the predetermined time may be set at a shorter period than the open period of the ASV 24 during the AI control. When the open period of the ASV 24 during the AI control is set between 20 and 30 seconds, the predetermined time is set to be shorter than this period. In this embodiment, the predetermined time is set at 500 milliseconds.

When it is confirmed that the predetermined time has elapsed in Step S111 such that an affirmative determination is made, the routine advances to Step S112. When a negative determination is made, on the other hand, the processing of Step S111 is repeated. In Step S112, the ASV 24 is set in the open condition. Then, in Step S113, a determination is made as to whether or not a predetermined time has elapsed after setting the ASV 24 in the open condition. In this embodiment, the predetermined time is set at 500 milliseconds. When it is confirmed that the predetermined time has elapsed in Step S113 such that an affirmative determination is made, the routine advances to Step S114. When a negative determination is made, on the other hand, the processing of Step S113 is repeated. In Step S114, the ASV 24 is set in the closed condition.

By opening and closing the ASV 24 at short intervals in this manner, foreign matter caught around the connecting hole 23*a* is blown away and removed. Note that opening and closing of the ASV 24 may also have the effect of breaking up the foreign matter so that it can be removed more easily.

In alignment with the start of the foreign matter removal control in Step S12, monitoring of the conditions for terminating the foreign matter removal control is begun (Step S13). More specifically, counting of the number of opening/closing operations of the ASV 24 is begun. An operation extending to termination of the open condition following a shift from the closed condition to the open condition is counted as one operation. Following Step S13, the processing is returned.

When the processing of Step S9 is performed again after passing through Step S13, the foreign matter removal control is underway, and therefore a negative determination is made in Step S9, assuming that the foreign matter removal control flag is not OFF. The routine then advances to Step S14.

In Step S14, a determination is made as to whether or not the condition for terminating the foreign matter removal control is satisfied. More specifically, a determination is made as to whether or not the number of opening/closing operations of the ASV 24 has reached a predetermined number. When a negative determination is made in Step S14, the routine advances to Step S15. In Step S15, the foreign matter removal control started in Step S12 is continued. Next, in Step S16, processing is performed to continue the monitoring started in Step S13. The processing of Step S15 and Step S16 may be performed simultaneously or in reverse order. Following Step S16, the processing is returned.

When the conditions for terminating the foreign matter removal control is determined to be satisfied in Step S14 such that an affirmative determination is made, the routine advances to Step S17. In Step S17, the ASV 24 is set in the closed condition. Then, in Step S18, the foreign matter removal control flag is set to OFF and a foreign matter removal control completion flag is set to ON.

In Step S19 after Step S18, the A/P 22 is stopped. The A/P 22 is stopped after setting the ASV 24 in the closed condition to prevent exhaust gas from entering the secondary air supply passage 23. Following Step S19, the processing is returned.

When the processing of Step S8 is performed again after setting the foreign matter removal completion flag to ON in Step S18, a negative determination is made in Step S8. The AI control history is then deleted in Step S20. Following Step S20, the processing is returned.

Thus, the processing series extending from the AI control to the foreign matter removal control is complete. Following completion of the foreign matter removal control, it is possible to shift to OBD, as shown by the flowchart in FIG. 3 (S53). OBD control can therefore be performed in a condition where foreign matter caught in the ASV 24 has been removed in advance. In other words, the OBD control is performed in a condition where foreign matter has been removed in advance such that an open sticking abnormality caused by foreign matter caught in the ASV 24 is not detected. As a result, the possibility of detecting an abnormality having an unidentified cause during the OBD control is reduced. When an abnormality, cause of which cannot be identified, is detected, component replacement must be performed. Hence, by reducing the possibility of detecting an abnormality having an unidentified cause, maintenance costs can be reduced. Note that OBD includes not only an abnormality diagnosis on the ASV 24 but also an abnormality diagnosis on the A/P 22. OBD includes various conventional methods, and another method may be employed. In OBD, for example, pressure and pressure variation values at the time of a secondary air supply stoppage may be measured using the front side pressure sensor 241, and an abnormality may be determined on the basis of these measured values.

By performing the foreign matter removal control before OBD, the following effects can be expected. Foreign matter caught in the ASV 24 also causes exhaust gas to flow back into a pipe into which the secondary air is introduced. Exhaust gas backflow leads to carbon adhesion and entry of other foreign matter. By performing the foreign matter removal control in advance after the AI control, these problems can be eliminated at an early stage.

In the above embodiment, the number of opening/closing operations of the ASV 24 is used as the conditions for terminating the foreign matter removal control. Instead of counting the number of opening/closing operations, however, a implementation time on the foreign matter removal control may be used. More specifically, an elapsed time following a start point of the foreign matter removal control is monitored. As shown in the time chart of FIG. 4, measurement of the implementation time on the foreign matter removal control is started at a timing at which the foreign matter removal control flag is set to ON. The foreign matter removal control may then be terminated, assuming that the foreign matter removal control termination condition is satisfied, when a predetermined time has elapsed. By terminating the foreign matter removal control as early as possible, a length and a frequency of operations of the A/P 22 while the ASV is in the closed condition can be reduced, and as a result, a load exerted on the A/P 22 during the foreign matter removal control can be lightened.

Further, the conditions for terminating the foreign matter removal control may be determined by referring to a pressure condition in the secondary air supply passage 23 during the opening/closing operation of the ASV 24. For example, the pressure condition in the secondary air supply passage 23 is determined by referring to a pressure value (an ASV front pressure) on the upstream side of the ASV 24 when the ASV 24 is in the closed condition. A determination is then made as to whether or not the condition for terminating the foreign matter removal control is satisfied. The pressure value on the upstream side of the ASV 24 can be measured by the front side pressure sensor 241. FIG. 4 shows variation in the ASV front pressure. The ASV front pressure varies in accordance with opening/closing of the ASV 24. More specifically, the ASV front pressure rises when the ASV 24 is in the closed condition and falls when the ASV 24 is in the open condition. Further, in the open condition, the ASV 24 communicates with the exhaust port, and therefore an exhaust gas pulsation effect appears such that small rising and falling motions of the ASV front pressure are observed.

Figure 8:
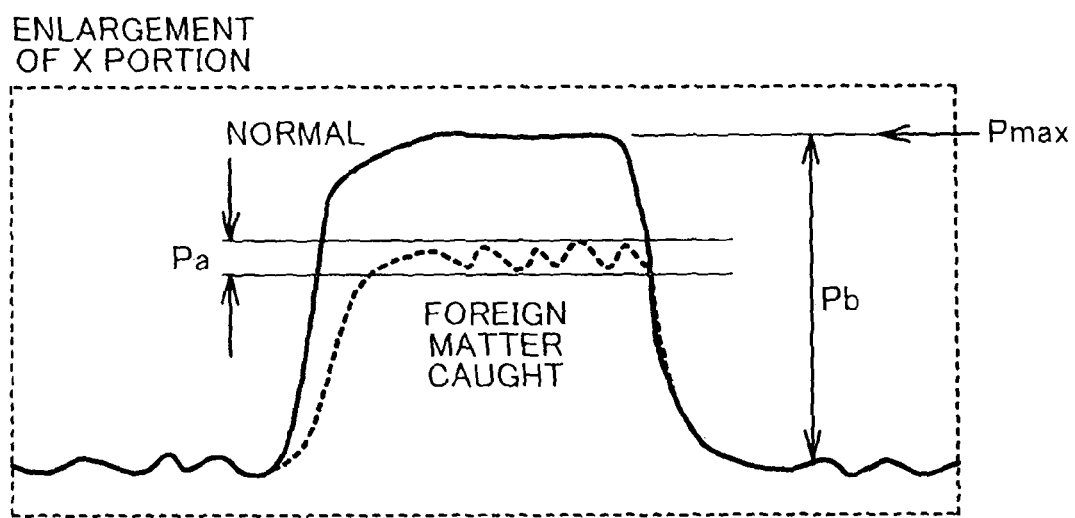
FIG. 8 is an enlarged illustrative view showing an X portion of FIG. 4.

FIG. 8 is an enlarged illustrative view showing an X portion of FIG. 4. When no foreign matter is caught in the ASV 24, the connecting hole 23a is closed by setting the ASV 24 in the closed condition; and therefore a prescribed value Pmax is observed as the ASV front pressure. When Pmax is observed, it may be determined that foreign matter has been removed, and therefore that the condition for terminating the foreign matter removal control is satisfied.

When an abnormality is acknowledged, on the other hand, as shown by a dotted line in FIG. 8, the connecting hole 23a cannot be closed completely. Therefore, the ASV front pressure does not reach Pmax. Hence, the presence or absence of foreign matter caught in the ASV 24 can be determined by monitoring the pressure condition, and when it is determined that the caught foreign matter has been removed, the foreign matter removal control can be terminated immediately.

Further, a pressure variation value Pa on the upstream side of the ASV 24, which is observed by the front side pressure sensor 241, may be referred to as another condition. When the connecting hole 23a is closed, exhaust gas pulsation has no influence on the pressure variation value Pa. Therefore, when the pressure variation value Pa is observed even though the ASV 24 is in the closed condition, it may be determined that foreign matter is caught in the ASV 24. When the pressure variation value Pa is no longer observed, it may be determined that the foreign matter has been removed.

Furthermore, a difference value Pb between the pressure value on the upstream side of the ASV 24 when the ASV 24 is in the closed condition and the pressure value on the upstream side of the ASV 24 when the ASV 24 is in the open condition may be referred to as another condition. When the ASV 24 is in the closed condition and no foreign matter is caught therein, the difference value Pb equals or exceeds a predetermined value. Therefore, the determination as to whether or not foreign matter removal is complete may be made in accordance with the difference value Pb.

Figure 9:
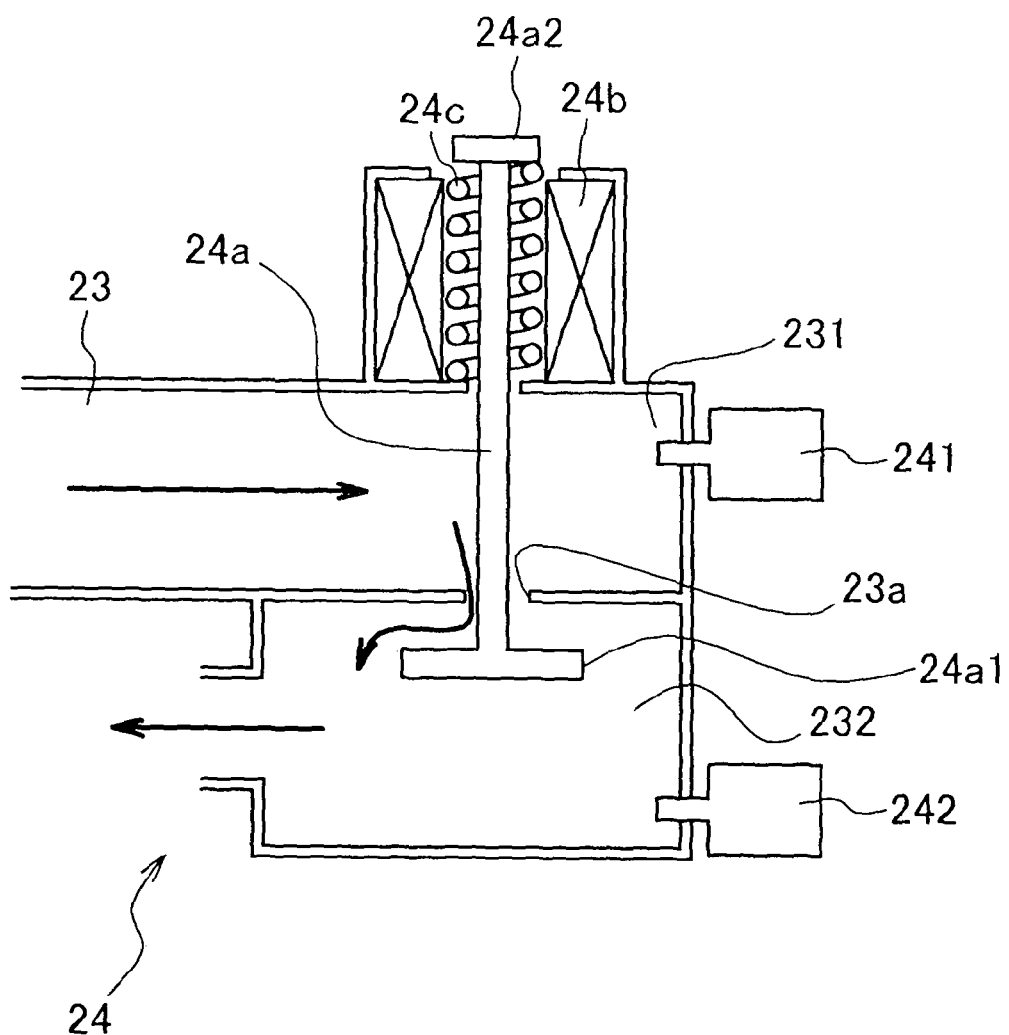
FIG. 9 is an illustrative view showing a pressure sensor arrangement according to another embodiment.

In the above embodiment, the front side pressure sensor 241 is disposed on the upstream side of the ASV 24. As shown in FIG. 9, however, a rear side pressure sensor 242 provided on a downstream side of the ASV 24 may be disposed together with the front side pressure sensor 241, and the conditions for terminating the foreign matter removal control may be determined on the basis of measured values obtained by these sensors.

Figure 10A:
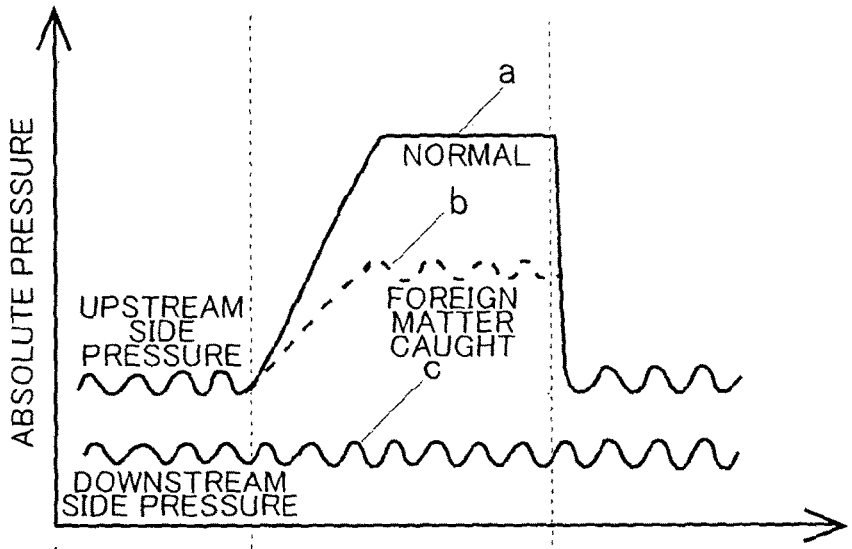
FIG. 10A is a graph showing variation in a pressure condition in a secondary air supply passage accompanying an ASV operation.
Figure 10B:
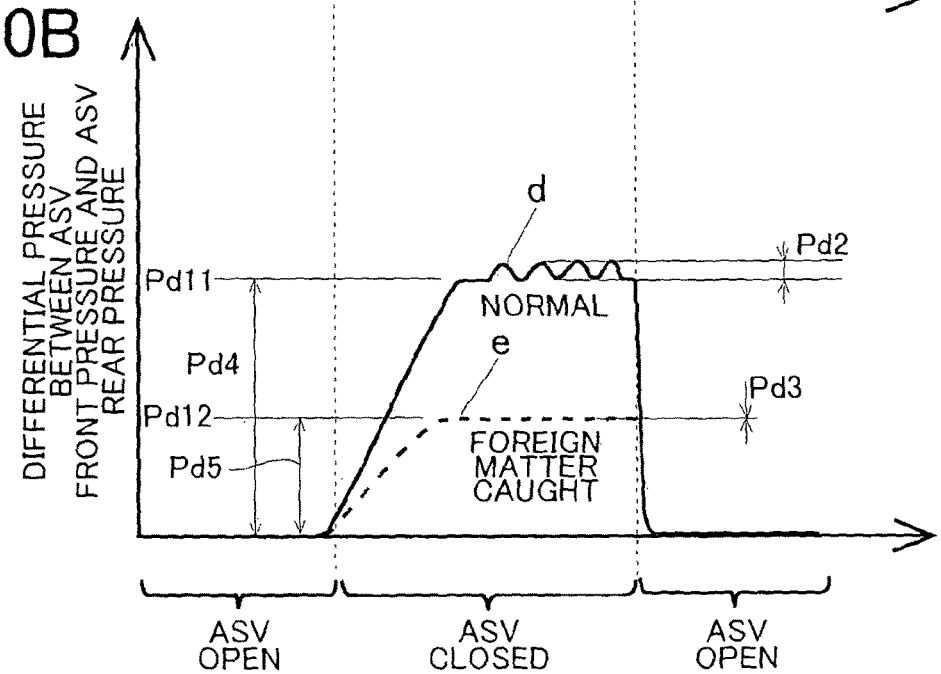
FIG. 10B is a graph showing variation in the pressure condition in the secondary air supply passage accompanying the ASV operation.

FIGS. 10A and 10B are graphs showing variation in the pressure condition in the secondary air supply passage 23 accompanying an operation of the ASV 24. To facilitate description, schematic waveforms are depicted in FIGS. 10A and 10B, and the waveforms are partially exaggerated. A reference symbol, a, in FIG. 10A indicates variation in the upstream side pressure when no foreign matter is caught in the ASV 24 such that the ASV 24 is operating normally. In other words, a indicates variation in an absolute pressure measured by the front side pressure sensor 241 when the ASV 24 is normal. When the ASV 24 is in the open condition, the pressure on the upstream side of the ASV 24 is affected by exhaust gas pulsation. When the ASV 24 enters the closed condition, the absolute pressure on the upstream side of the ASV 24 rises. When the ASV 24 is completely closed, the effect of exhaust gas pulsation is no longer observed. A reference symbol, b, in FIG. 10A indicates variation in the ASV front pressure when foreign matter is caught in the ASV 24. When foreign matter is caught in the ASV 24, the upstream side of the ASV 24 also communicates with the exhaust port 15 side, and therefore the effect of exhaust gas pulsation is observed. Further, a maximum value of the absolute pressure is lower than that during a normal operation. A reference symbol, c, in FIG. 10A indicates variation in a downstream side pressure (an ASV rear pressure) of the ASV 24. An absolute pressure on the downstream side of the ASV 24 is affected by exhaust gas pulsation at all times.

A reference symbol, d, in FIG. 10B indicates variation in a differential pressure between the ASV front pressure and the ASV rear pressure when no foreign matter is caught in the ASV 24 such that the ASV 24 operates normally. When the ASV 24 is in the open condition, the upstream side and the downstream side of the ASV 24 are both affected by exhaust gas pulsation. Since the graph illustrating the reference symbol, d, in FIG. 10B corresponds to the differential pressure between the ASV front pressure and the ASV rear pressure, which are both affected by exhaust gas pulsation, no small rising and falling motions appear on the waveform observed when the ASV 24 is in the open condition. When the ASV 24 is in the closed condition, on the other hand, only the downstream side of the ASV 24 is affected by exhaust gas pulsation. Since the graph illustrating the reference symbol, d, corresponds to the differential pressure between the ASV rear pressure, which is affected by exhaust gas pulsation, and the ASV front pressure, which is not affected by exhaust gas pulsation, small rising and falling motions appear on the waveform observed when the ASV 24 is in the closed condition.

A reference symbol, e, in FIG. 10B indicates variation in the differential pressure between the ASV front pressure and the ASV rear pressure when foreign matter is caught in the ASV 24. When foreign matter is caught in the ASV 24, the upstream side of the ASV 24 also communicates with the exhaust port 15 side, and therefore both the upstream side and the downstream side of the ASV 24 are affected by exhaust gas pulsation. Since the graph illustrating the reference symbol, e, corresponds to the differential pressure between the ASV front pressure and the ASV rear pressure, which are both affected by exhaust gas pulsation, no small rising and falling motions appear on the observed waveform.

As described above, various numerical values can be obtained using the front side pressure sensor 241 and the rear side pressure sensor 242. The obtained numerical values can then be used to determine whether or not the condition for terminating the foreign matter removal control is satisfied.

For example, a determination may be made by referring to the difference value between the pressure value (ASV front pressure) on the upstream side of the ASV 24 and the pressure value (ASV rear pressure) on the downstream side of the ASV 24 when the ASV 24 is in the closed condition. When the ASV 24 is in the closed condition and no foreign matter is caught in the ASV 24, the pressure on the upstream side of the ASV 24 increases, leading to an increase in the difference value relative to the downstream side, and as a result, a difference value Pd11, for example, is observed. When the difference, value is smaller than a predetermined value, on the other hand, it may be determined that foreign matter is caught in the ASV 24 such that the upstream side and the downstream side are communicated. For example, when a difference value Pd12, which is smaller than the difference value Pd11, is observed, it is determined that foreign matter is caught in the ASV 24. When the foreign matter removal control is performed such that the difference value exceeds the predetermined value, the foreign matter removal control is terminated, assuming that foreign matter removal is complete.

Further, as shown in FIG. 9, when the front side pressure sensor 241 and the rear side pressure sensor 242 are provided, the determination may be made by referring to a difference value between the pressure variation value on the upstream side of the ASV 24 and the pressure variation value on the downstream side of the ASV 24 when the ASV 24 is in the closed condition. When the ASV 24 is in the closed condition and no foreign matter is caught in the ASV 24, a difference value Pd2 between the pressure variation values is observed, as indicated by the reference symbol, d, in FIG. 10B. In other words, small rising and falling motions are observed in the difference value between the pressure variation value on the upstream side of the ASV 24 and the pressure variation value on the downstream side of the ASV 24. When, on the other hand, small rising and falling motions are not observed such that a difference value Pd3 is equal to substantially zero, as indicated by the reference symbol, e, in FIG. 10B, it may be determined that the upstream side pressure variation value is also being affected by exhaust gas pulsation. In other words, it may be determined that foreign matter is caught in the ASV 24 such that the upstream side and the downstream side are communicated. When the foreign matter removal control is performed such that small rising and falling motions are observed in the difference value, the foreign matter removal control is terminated, assuming that foreign matter removal is complete.

Furthermore, as shown in FIG. 9, when the front side pressure sensor 241 and the rear side pressure sensor 242 are provided, the determination may be made by referring to a difference value between a front-rear differential pressure value of the ASV 24 when the ASV 24 is in the closed condition and a front-rear differential pressure value of the ASV 24 when the ASV 24 is in the open condition. The front-rear differential pressure value when the ASV 24 is in the open condition is substantially zero. The front-rear differential pressure value when the ASV 24 is in the closed condition is larger than the value when the ASV 24 is in the open condition. When no foreign matter is caught in the ASV 24, a difference value Pd4 is observed. When foreign matter is caught in the ASV 24, on the other hand, a difference value Pd5 that is smaller than the difference value Pd4 is observed. When the foreign matter removal control is performed, thereby cutting off a communication between the upstream side and the downstream side of the ASV 24 such that the difference value increases beyond a predetermined value, the foreign matter removal control is terminated, assuming that foreign matter removal is complete.

Figure 11:
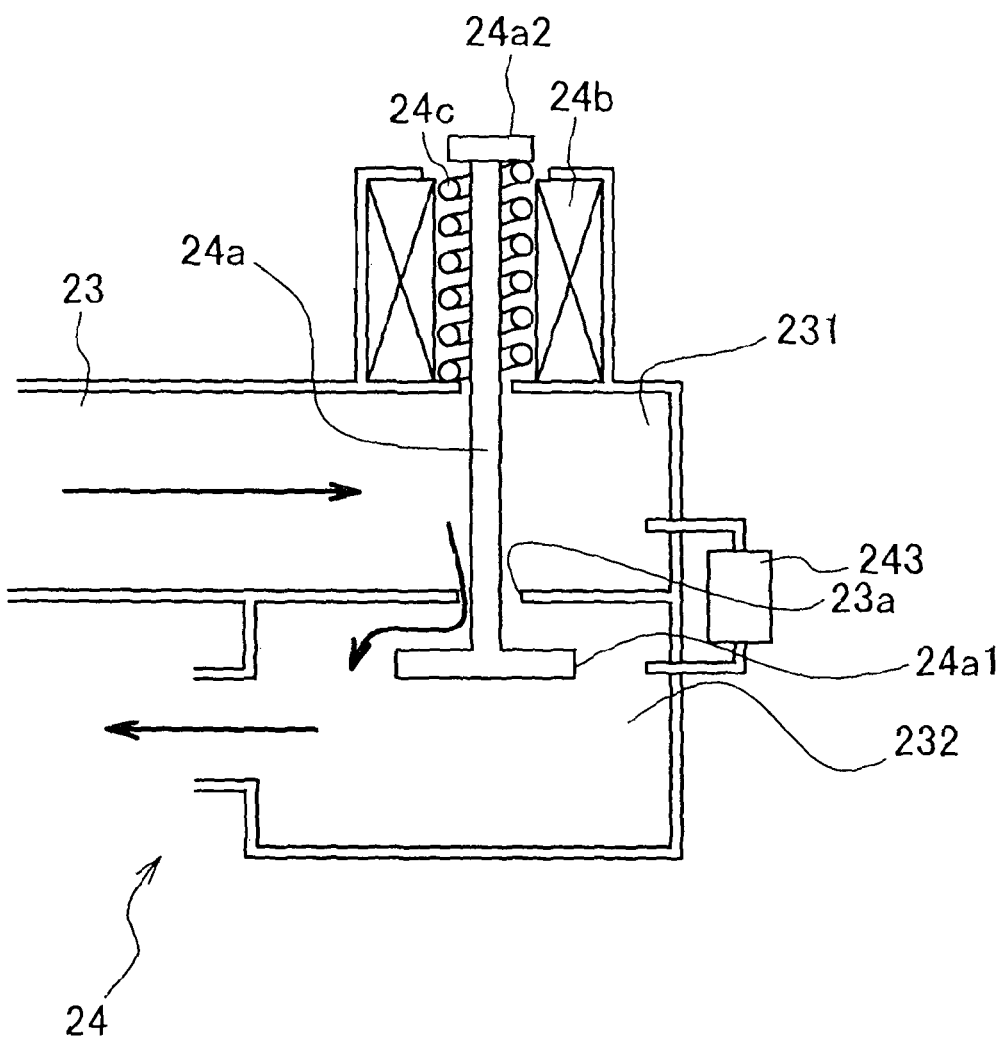
FIG. 11 is an illustrative view showing a pressure sensor arrangement according to a further embodiment.

When the difference value between the upstream side pressure and the downstream side pressure of the ASV 24 is referred to in this manner, a front-rear differential pressure sensor 243 may be provided, as shown in FIG. 11, in place of the combination of the front side pressure sensor 241 and the rear side pressure sensor 242. By providing the front-rear differential pressure sensor 243, the determination as to whether or not the foreign matter removal control termination condition is satisfied can be made on the basis of the front-rear pressure condition of the ASV 24 in a similar manner to that described above.

As described above, by performing the foreign matter removal control, erroneous diagnoses during OBD can be suppressed. Here, to remove foreign matter even more efficiently, a following configuration may be employed.

Figure 12:
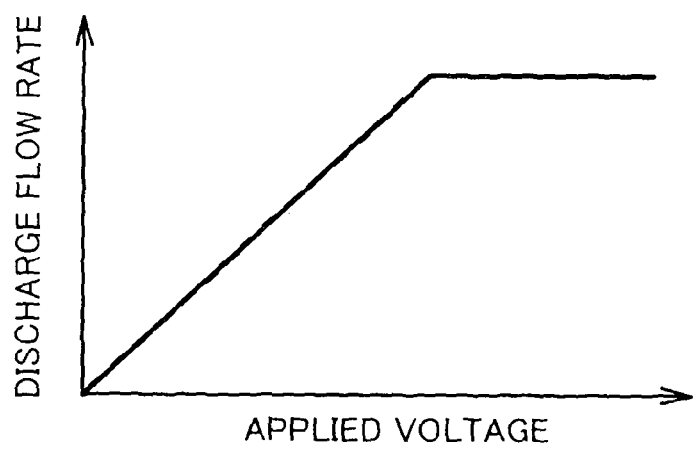
FIG. 12 is an illustrative view showing a relationship between an applied voltage and a discharge amount of an A/P in which a pumped air amount is variable.

The secondary air supply device 21 includes the A/P 22 in which a pumped air amount is variable. During the foreign matter removal control, the engine ECU 10 serving as a controller increases the amount of air pumped by the A/P 22 above the amount of air pumped at a time when the foreign matter removal control is not underway, or in other words during the secondary air supply control for supplying secondary air to the secondary air supply passage 23. FIG. 12 is a graph showing a relationship between an applied voltage and a discharge flow rate of the A/P 22. When the foreign matter removal control is underway, the engine ECU 10 increases the applied voltage. Accordingly, the amount of pumped air is increased, leading to an increase in the air force with which the air passes through the ASV 24. As a result, the foreign matter can be removed more easily.

The embodiment described above is merely an example for implementing the invention. Hence, the invention is not limited to this embodiment, and various amendments and modifications may be applied thereto within the scope of the spirit of the inventions described in the claims.

The invention claimed is:

1. An internal combustion engine control apparatus having a secondary air supply device that includes a secondary air supply passage that supplies secondary air pumped by an air pump into an exhaust system of an internal combustion engine and an opening/closing unit that opens and closes the secondary air supply passage, the control apparatus comprising:
a controller that includes a processor and memory, the controller is configured to receive detection results from at least one pressure sensor located in the secondary air supply device downstream of the opening/closing unit, and the controller performs the following control:
setting the opening/closing unit in an open condition such that the secondary air is supplied to the secondary air supply passage; and
then executing foreign matter removal control in which the opening/closing unit is opened and closed repeatedly at short intervals, wherein the foreign matter removal control is executed before performing an abnormality diagnosis on the secondary air supply device;
wherein the foreign matter removal control is terminated when:
a pressure condition downstream of the opening/closing unit in the secondary air supply passage accompanying the opening/closing operation of the opening/closing unit is satisfied, and
a number of opening/closing operations performed in the opening/closing unit during the foreign matter removal control has reached a predetermined number,
wherein the pressure condition in the secondary air supply passage is determined by referring to a difference value between a pressure variation value on an upstream side of the opening/closing unit and a pressure variation value on a downstream side of the opening/closing unit when the opening/closing unit is in a closed condition.

2. The internal combustion engine control apparatus according to claim 1, wherein an opening/closing operation performed in the opening/closing unit during the foreign matter removal control has a shorter opening/closing interval than an opening/closing operation performed in the opening/closing unit during secondary air supply for supplying the secondary air to the secondary air supply passage.

3. The internal combustion engine control apparatus according to claim 1, wherein the determination as to whether or not the condition for terminating the foreign matter removal control is satisfied is made in accordance with an elapsed time following a start point of the foreign matter removal control.

4. The internal combustion engine control apparatus according to claim 1, wherein the pressure condition in the secondary air supply passage is a pressure value on an upstream side of the opening/closing unit when the opening/closing unit is in a closed condition.

5. The internal combustion engine control apparatus according to claim 1, wherein the pressure condition in the secondary air supply passage is determined by referring to a pressure variation value on an upstream side of the opening/closing unit when the opening/closing unit is in a closed condition.

6. The internal combustion engine control apparatus according to claim 1, wherein the pressure condition in the secondary air supply passage is determined by referring to a I difference value between a pressure value on an upstream side of the opening/closing unit when the opening/closing unit is in a closed condition and the pressure value on the upstream side of the opening/closing unit when the opening/closing unit is in the open condition.

7. The internal combustion engine control apparatus according to claim 1, wherein the pressure condition in the secondary air supply passage is determined by referring to a difference value between a pressure value on an upstream side of the opening/closing unit and a pressure value on a downstream side of the opening/closing unit when the opening/closing unit is in a closed condition.

8. The internal combustion engine control apparatus according to claim 1, wherein the pressure condition in the secondary air supply passage is determined by referring to a difference value between a differential pressure value between a pressure value on an upstream side of the opening/closing unit and a pressure value on a downstream side of the opening/closing unit when the opening/closing unit is in a closed condition and the differential pressure value between the pressure value on the upstream side of the opening/closing unit and the pressure value on the downstream side of the opening/closing unit when the opening/closing unit is in the open condition.

9. The internal combustion engine control apparatus according to claim 1, wherein an amount of air pumped by the air pump can be varied, and
the controller increases the amount of air pumped by the air pump during the foreign matter removal control beyond the amount of air pumped by the air pump during the secondary air supply control.

10. The internal combustion engine control apparatus according to claim 1, wherein the controller performs the abnormality diagnosis on the secondary air supply device after the foreign matter removal control is terminated.

11. A control method for an internal combustion engine having a secondary air supply device that includes a secondary air supply passage that supplies secondary air pumped by an air pump into an exhaust system of an internal combustion engine, and an opening/closing unit that opens and closes the secondary air supply passage, and a controller that includes a processor and memory, and that is configured to receive detection results from at least one pressure sensor located in the secondary air supply device downstream of the opening/closing unit, the control method comprising:
setting the opening/closing unit in an open condition such that the secondary air is supplied to the secondary air supply passage; and
then executing foreign matter removal control in which the opening/closing unit is opened and closed repeatedly at short intervals, wherein the foreign matter removal control is executed before performing an abnormality diagnosis on the secondary air supply device;
receiving detection results from the at least one pressure sensor located in the secondary air supply device downstream of the opening/closing unit;

determining a pressure condition with the controller,
wherein the foreign matter removal control is terminated when:
  the pressure condition in the secondary air supply passage accompanying the opening/closing operation of the opening/closing unit is satisfied, and
  a number of opening/closing operations performed in the opening/closing unit during the foreign matter removal control has reached a predetermined number,
wherein the pressure condition in the secondary air supply passage is determined by referring to a difference value between a pressure variation value on an upstream side of the opening/closing unit and a pressure variation value on a downstream side of the opening/closing unit when the opening/closing unit is in a closed condition.

* * * * *